United States Patent
Equoy et al.

(10) Patent No.: US 11,519,518 B2
(45) Date of Patent: Dec. 6, 2022

(54) GEAR MOTOR, PARTICULARLY INTENDED FOR AN AIR CIRCULATION VALVE

(71) Applicant: MOVING MAGNET TECHNOLOGIES, Besançon (FR)

(72) Inventors: Samuel Equoy, Besançon (FR); Gaël Andrieux, Evilard (CH)

(73) Assignee: MOVING MAGNET TECHNOLOGIES, Besancon (FR)

( * ) Notice: Subject to any disclaimer, the term of this patent is extended or adjusted under 35 U.S.C. 154(b) by 307 days.

(21) Appl. No.: 16/463,807

(22) PCT Filed: Nov. 20, 2017

(86) PCT No.: PCT/FR2017/053170
§ 371 (c)(1),
(2) Date: May 23, 2019

(87) PCT Pub. No.: WO2018/096246
PCT Pub. Date: May 31, 2018

(65) Prior Publication Data
US 2019/0285190 A1  Sep. 19, 2019

(30) Foreign Application Priority Data
Nov. 24, 2016 (FR) ...................................... 1661430

(51) Int. Cl.
*H02K 21/16* (2006.01)
*F16K 31/04* (2006.01)
(Continued)

(52) U.S. Cl.
CPC .............. *F16K 31/043* (2013.01); *F02D 9/10* (2013.01); *F02D 9/1065* (2013.01); *F16K 1/221* (2013.01);
(Continued)

(58) Field of Classification Search
CPC .......... H02K 37/14; H02K 7/10; H02K 37/12; H02K 7/116; H02K 1/185
See application file for complete search history.

(56) References Cited

U.S. PATENT DOCUMENTS 7,591,245 B2    9/2009  Baasch et al.
8,339,003 B2 *  12/2012  Prudham ................ H02K 21/14
                                                          310/83
(Continued)

FOREIGN PATENT DOCUMENTS

WO  WO-2018060630 A1 *  4/2018  .............. F02D 11/10

*Primary Examiner* — Leda T Pham
(74) *Attorney, Agent, or Firm* — Harness Dickey & Pierce, PLC (57) ABSTRACT

The disclosure relates to a motorised air circulation valve including a gear motor, a valve body, and a rotary shaft provided with a shutter. The rotary shaft is rotated by the gear motor, where gear motor includes a set of reduction gears, a brushless electric motor formed by a rotor having N pairs of magnetised poles connected to a pinion of the set of reduction gears, and the pinion drives an output wheel rigidly connected to the rotary shaft. The electric motor includes a stator part having at least two coils, the stator part having two angular sectors, alpha1 and alpha2, of respective radii R1 and R2, with R1 being greater than R2, and the center of the radii and the angular sectors being defined relative to the center of rotation of the rotor. The angular sector alpha1 is defined by the angular deviation between the axes of the first and last coils considered in a circumferential direction of the motor, the angular sector alpha1 is less than 180° and includes the coils, the sector alpha2 is devoid of a fully fitted coil, an end of the gear motor defines a side of the gear motor, and the angular sector alpha2 of the stator part is positioned facing the side.

13 Claims, 7 Drawing Sheets

(51) Int. Cl.
  *H02K 11/215* (2016.01)
  *F16K 1/22* (2006.01)
  *F16K 27/02* (2006.01)
  *H02K 1/27* (2022.01)
  *H02K 7/116* (2006.01)
  *H02K 21/14* (2006.01)
  *H02K 11/33* (2016.01)
  *F02D 9/10* (2006.01)
  *H02K 1/14* (2006.01)
  *H02K 7/14* (2006.01)
  *H02K 37/14* (2006.01)

(52) U.S. Cl.
  CPC ........ *F16K 27/0218* (2013.01); *F16K 31/041* (2013.01); *H02K 1/146* (2013.01); *H02K 1/27* (2013.01); *H02K 7/116* (2013.01); *H02K 7/14* (2013.01); *H02K 11/215* (2016.01); *H02K 11/33* (2016.01); *H02K 21/14* (2013.01); *H02K 21/16* (2013.01); *H02K 37/14* (2013.01); *H02K 2213/03* (2013.01)

(56) References Cited

U.S. PATENT DOCUMENTS

| | | | |
|---|---|---|---|
| 10,644,546 B2* | 5/2020 | Billet | H02K 1/18 |
| 2003/0178004 A1 | 9/2003 | Keefover et al. | |
| 2006/0097588 A1 | 5/2006 | Nakane | |
| 2011/0031824 A1 | 2/2011 | Prudham | |
| 2012/0181641 A1 | 7/2012 | Hiramoto et al. | |
| 2012/0313025 A1 | 12/2012 | Takai et al. | |
| 2014/0130763 A1 | 5/2014 | Boom et al. | |
| 2015/0137639 A1* | 5/2015 | Gomyo | H02K 3/522 |
| | | | 310/71 |
| 2015/0263572 A1 | 9/2015 | Hyppias et al. | |
| 2015/0266542 A1* | 9/2015 | Marioni | H02K 21/02 |
| | | | 180/62 |
| 2017/0331409 A1 | 11/2017 | Andrieux et al. | |
| 2017/0370493 A1 | 12/2017 | Sigg et al. | |
| 2019/0229587 A1* | 7/2019 | Watrin | H02K 11/215 |

\* cited by examiner

GEAR MOTOR, PARTICULARLY INTENDED FOR AN AIR CIRCULATION VALVE

CROSS-REFERENCE TO RELATED APPLICATIONS

This application is a National Phase Entry of International Patent Application No. PCT/FR2017/053170, filed on Nov. 20, 2017, which claims priority to French Patent Application No. 16/61430, filed on Nov. 24, 2016, both of which are incorporated by reference herein.

TECHNICAL FIELD

The invention relates to a compact gear motor, in particular for regulating the air flow in a motor vehicle. According to a preferred application, the invention relates to a valve associated with a compact gear motor, ensuring the control of said valve.

BACKGROUND

The international patent application WO2009034270 disclosing a gear motor is known, with a gear motor including a multiphase electric motor formed by a stator portion excited by electric coils and by a rotor having N pairs of poles radially magnetized in alternating directions, the stator portion including two angular sectors alpha-1 and alpha-2, respective radii R1 and R2, comprising wide teeth and narrow teeth extending radially from an annular gear, characterized in that the wide teeth have a width greater than or equal to twice the width of the narrow teeth, in that the width of a notch is greater than the width of a narrow tooth, in that the angular sector alpha-1 is less than 220° and includes all the coils, and in that the RI/R2 ratio ranges from 1.2 to 2.

Valves consisting of a valve body and a gear motor, as for example in U.S. Patent Publication No. 2003/0178004 is also known in the state of the art. The motor is direct current, large and positioned next to the valve body. The set of reduction gears is positioned above the valve body. The assembly is relatively cumbersome but allows the use of a set of reduction gears with a single-stage due to the large lever arms allowed by this voluminous construction.

In addition, U.S. Pat. No. 7,591,245 presents a more compact motorized valve with a gear motor located above the valve body and also using only one reduction stage. However, due to the shorter lever arm imposed by the more compact design in width, the brushless motor used for the gear motor is relatively large to provide generous torque, and forms a protrusion above the valve body that makes the design less compact in height, above the valve body.

Also known is U.S. Patent Publication No. 2012/0313025 describing a fluid control valve, wherein an actuator section and a valve section housing, which has a fluid passage, are designed separately, a water cooling passage being disposed between the actuator section and the valve section housing. In addition, on the actuator section side including the water cooling passage between the actuator section and the valve section housing, parts such as a bearing, a return spring and a gear that directly connects the actuator section and the valve stem to each other are arranged, which protect the actuator from heat transfer and heat radiation from a high temperature fluid present in large quantities.

SUMMARY

The purpose of the invention is to propose an improvement of the prior art productions by proposing a particularly compact gear motor, benefiting from a brushless motor of reduced size compared to the state of the art while allowing to keep a single reduction stage. However, the invention is not restricted to the use of a single reduction stage. According to a preferred application of the invention, this goal relates to the production of a motorized valve with these technical advantages. More particularly, the invention relates to a gear motor and/or a motorized air circulation valve according to one of the claims or a combination of these claims.

BRIEF DESCRIPTION OF THE FIGURES

Other characteristics and advantages of the invention will appear in the description that follows relative to detailed embodiments, and referring to the attached figures that represent respectively.

DETAILED DESCRIPTION OF ONE EMBODIMENT

Figure 1:
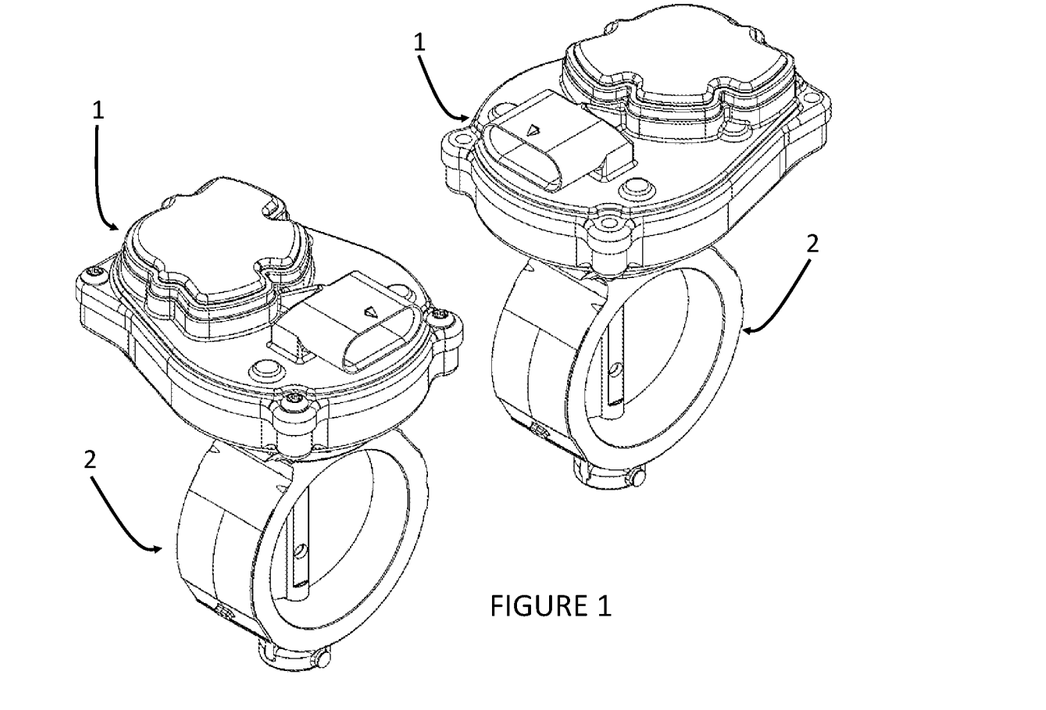
FIG. 1 is a perspective view of two motorized valves according to the invention.
Figure 6A:
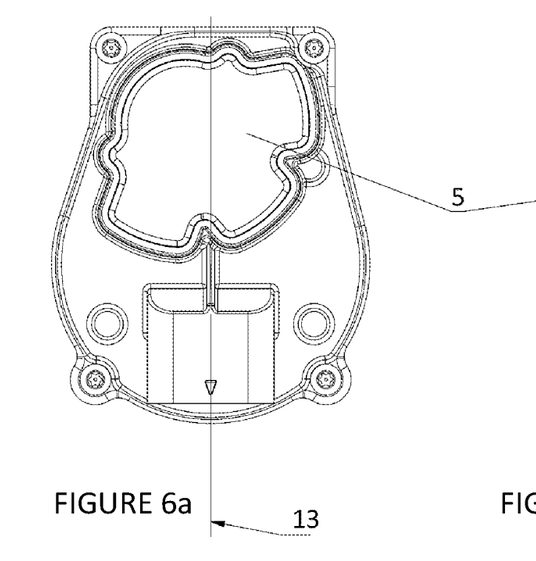
FIGS. 6a and 6b are the top views of the two motorized valves in FIGS. 1, 5a and 5b.
Figure 6B:
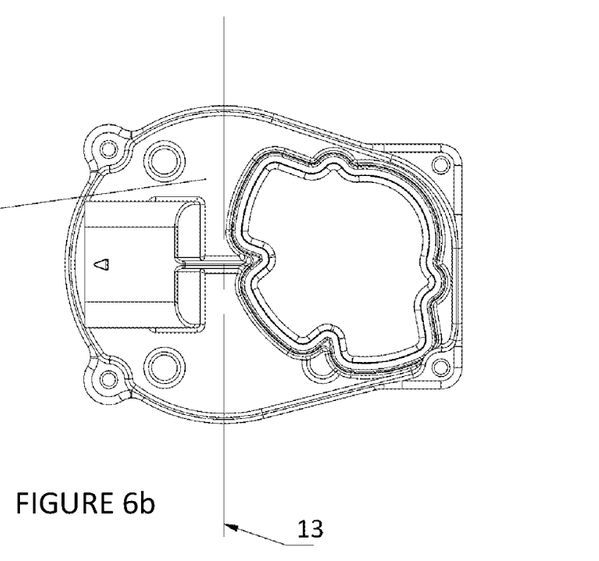

FIG. 1 shows a gear motor according to the invention, associated with a valve represented by two exemplary orientations. It shows the compactness of the gear motor 1 located above the valve body 2 and the great flexibility of production allowed by the invention. Indeed, in this FIG. 1, the possible orientation given to the gear motor 1 due to its compactness in height (thickness) and its location entirely above the valve body 2 is much appreciated. The gear motor 1 can be oriented in its longest length along the axis of the valve body 2, on the left in FIG. 1, or perpendicularly to this valve body axis 2, on the right in FIG. 1, or according to any angular orientation around the valve body axis 2. The valve body axis, or duct axis 13, is shown in FIGS. 6a and 6b for a better understanding.

Figure 2:
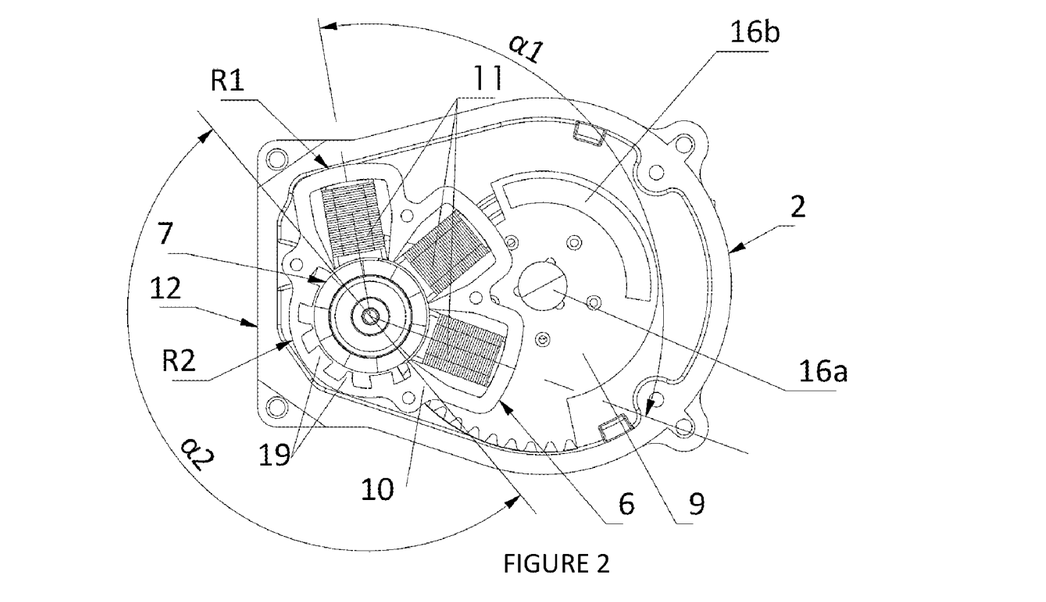
FIG. 2 is a top view, without a gear motor cover, of a motorized valve according to the invention.

FIG. 2 illustrates the integration according to the present invention of a gear motor 1 composed of a brushless electric motor 6 and a gear stage, seen from above without a cover. These elements are part of an indentation defined by the valve body 2, the electric motor 6 being placed as close as possible to the side 12 of the valve body 2, the side 12 defining one end of the gear motor 1.

FIG. 2 illustrates the particular use of the electric motor 6, which is similar to the motor described in the patent application WO2009034270 but used in an unexpected way here. Indeed, the motor 6 is positioned relative to the set of reduction gears so that the coils 11 of the stator part 10 are provided above the output wheel 9. This new configuration makes it possible to maximize the reduction ratio by reducing the distance between the axis of rotation of the rotor 7 and the side 12 of the gear motor 1 and thus by maximizing the distance between the pinion 8, visible in FIGS. 3 and 4, integral with the rotor 7, and the output wheel 9, thus promoting the use of a single reduction stage while allowing a torque multiplication suitable for closing the valve body 2.

Figure 11:
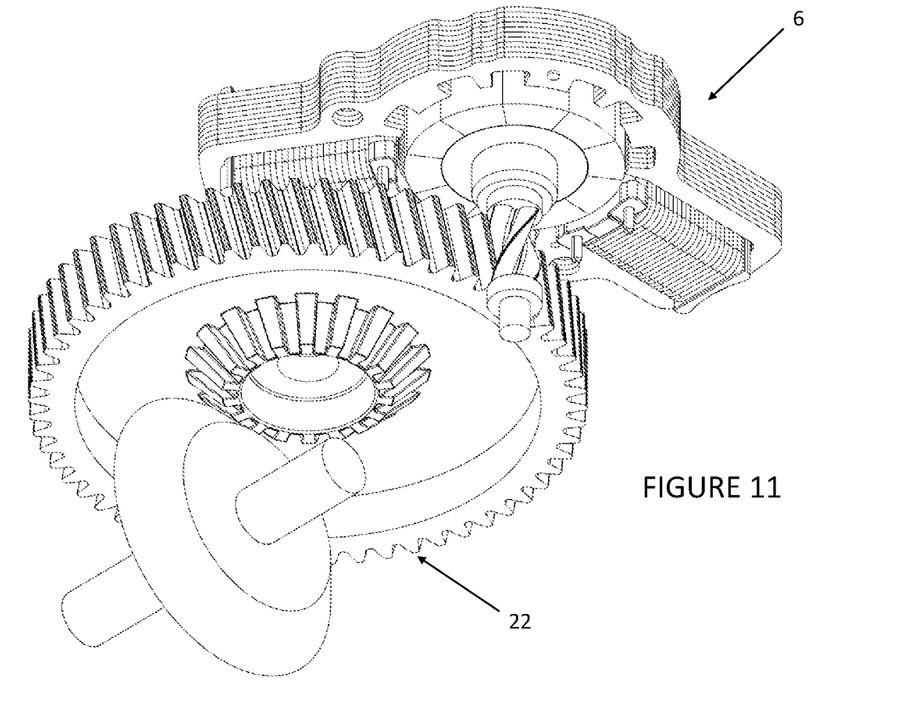
FIG. 11 shows an isolated perspective view of an electric motor and a set of reduction gear with a bevelled gear mounting that can be used in this invention.
Figure 12A:
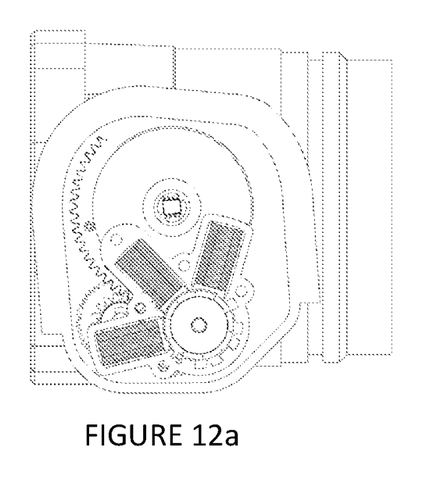
FIGS. 12a and 12b are top and perspective views respectively, of a gear motor according to the invention with three spur gear reduction stages.
Figure 12B:
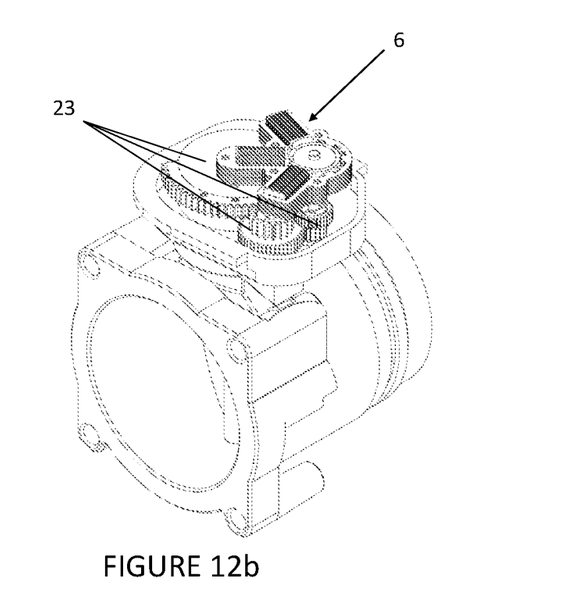

It is specified that, although the invention may be particularly enhanced for a single-stage reduction project, it is possible, while respecting the invention, to produce a gear motor with more than one reduction stage, for example two stages, as shown in FIG. 11, or for example three reduction stages, as shown in FIGS. 12a and 12b. The example in FIG. 11 suggests the use of a bevelled gear mounting 22. The example in FIGS. 12a and 12b proposes the use of three reduction stages as spur gears 23 with straight teeth.

The configuration of the motor 6 is such that it includes two main areas delimited by the angular sectors aI (alphaI) and α2 (alpha2). The angular αsector I is the one comprising the electric coils 11 of the motor 6, the sector being delimited by the winding axis of the first and last coils 11, counted circumferentially around the axis of rotation of the rotor 7. This area delimited by the angular sector aI has a radius R1, which is the largest radius of the motor 6. It should be noted that the number of coils is not limited to the example of the patent which considers a three-phase motor with three coils. For example, it may be considered to use, according to the invention, a two-phase motor with two coils.

The area delimited by the angular sector R2 has a radius R2 that is generally smaller than the radius R1. The distance between R2 and the axis of rotation of the rotor 7 is thus minimized, mainly defined by the internal radius of the rotor 6 magnet, the mechanical clearance between the rotor 7 and the stator part 10 and the thickness of the teeth, or the uncoiled poles 19 of the stator part 10 and the bottom thereof. By being positioned as close as possible to the side 12, the area delimited by the angular sector a2 thus makes it possible to minimize the distance between the axis of rotation of the rotor 7 and this side 12. This leads to the maximization of the distance between the axis of rotation of the rotor 7 and the axis of rotation 3 of the shutter 4 of the valve body 2. The stator part 10 may have teeth 19 of varying width according to the torque requirements without and with current required by the application, but preferably it has wide and narrow teeth respectively extending radially from an annular gear, the wide teeth having a width greater than or equal to twice the width of the narrow teeth.

Figure 3:
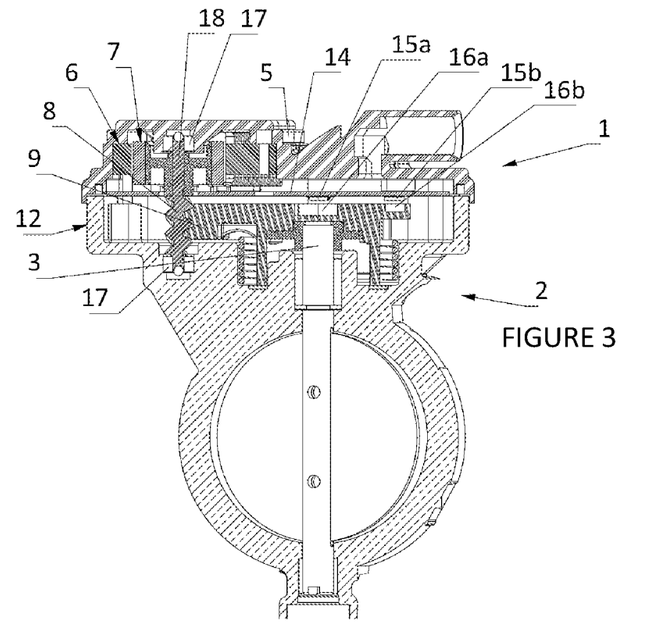
FIG. 3 is a cross-sectional view of a motorized valve according to the invention according to a first embodiment of the set of reduction gears.
Figure 4:
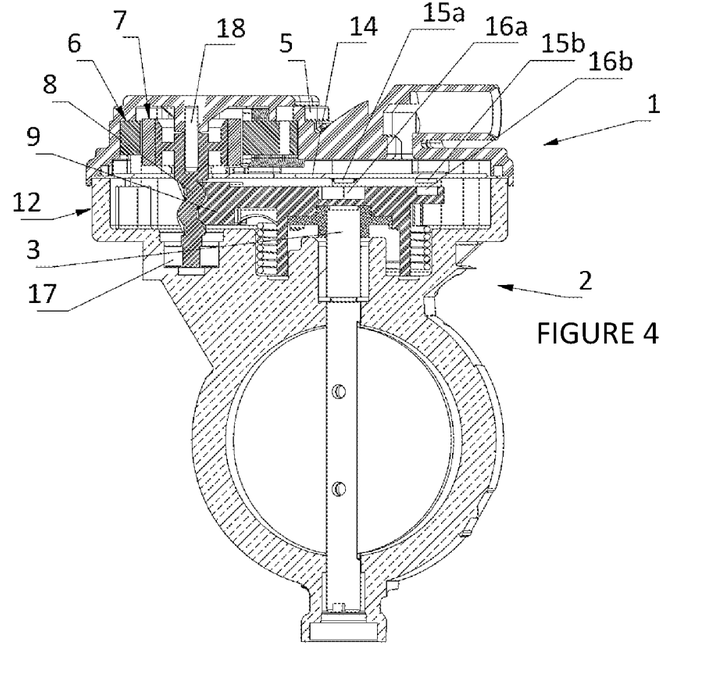
FIG. 4 is a cross-sectional view of a motorized valve according to the invention according to a second embodiment of the set of reduction gears.

FIGS. 3 and 4 show a gear motor 1 with a helical gear reduction stage—the pinion 8—wherein the value from the helix angle to the pitch circle can change. In FIG. 3, the helical teeth have a helix angle at the pitch circle of 40° and in FIG. 4, the helical teeth has a helix angle at the pitch circle of 25°. The use of helical teeth allows the use of a pinion 8 with a reduced number of teeth, thus increasing the gearing ratio. In order to minimize the axial forces generated, it is advisable to reduce the helix angle to the pitch circle.

Figure 10A:
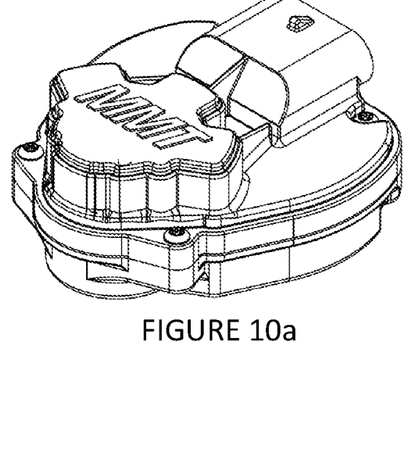
FIGS. 10a and 10b are perspective and cross-sectional views respectively of a particular embodiment of a cassette-shaped gear motor according to the invention.
Figure 10B:
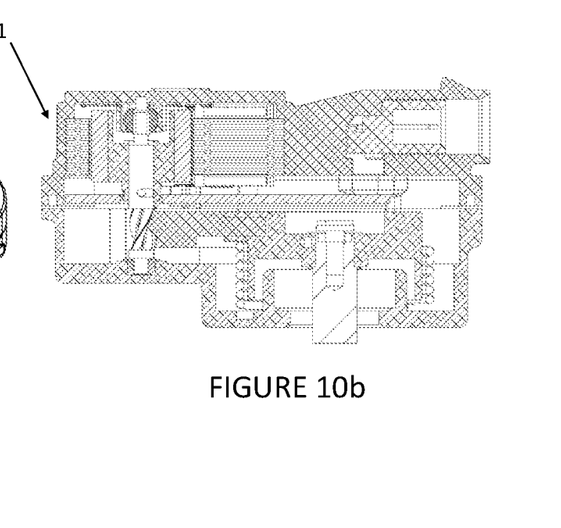

The outer part of the gear motor 1 is formed on the one hand by the extension of the valve body 2 and on the other hand by a cover 5, these two parts forming a sealed housing. It should be noted that a housing consisting of two separate parts decoupled from the valve body 2 can be considered. Thus, the gear motor forms a unit or cassette, as shown in FIGS. 10a and 10b, which can be fully mounted and then attached to the valve body 2.

Figure 7:
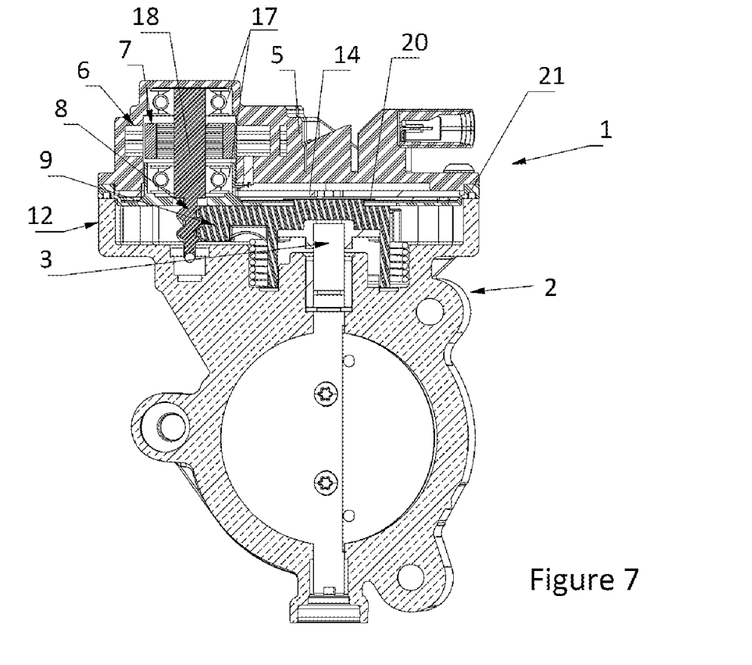
FIGS. 7 and 9 are cross-sectional, lateral and exploded perspective views, respectively, of a particular embodiment of a valve according to the invention.
Figure 8:
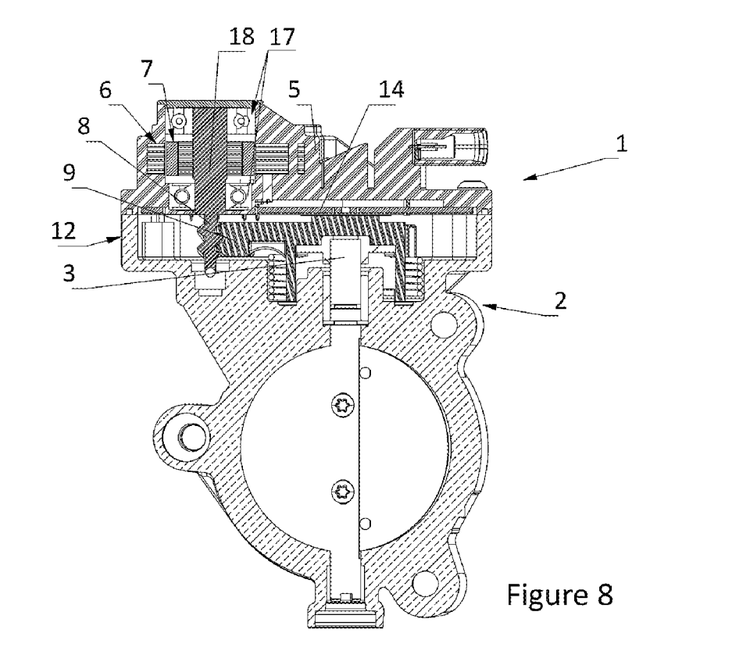
FIG. 8 is a cross-sectional view of a valve according to the invention according to another particular embodiment.

The cross-sectional view in FIG. 3 shows a guiding in rotation provided by means of two bearings 17 of the ball bearing type distributed on either side of the rotor axis 7. Other bearing types such as a plain bearing 17 with a guide shaft 18 inserted in the cover 5 guiding the rotor 7, as shown in FIG. 4, can also be used. Alternatively, as shown in FIG. 8, the gear motor 1 may have a cover 5 which includes the bearings 17 in order to benefit from an autonomous gear motor assembly 1 positioned on the valve body 2. For example, the bearings 17 are overmoulded in the cover 5. In another alternative, as shown in the FIGS. 7 and 9, an intermediate plate 21, positioned between the gear motor 1 and the valve body 2, is used to support in particular the lower bearing 17b, shown in FIG. 9 pre-positioned on the axis 3 of the gear motor 1.

FIG. 4 shows the stator part 10 integrated into the cover 5 and the printed circuit 14 attached to the electric motor 6, thus allowing the power supply of said electric motor 6 by means of an electric connection (e.g. soldering or press-fit type connection). The printed circuit 14 supports an electronic control circuit that controls the electric motor 6 and controls the air circulation valve in position by providing feedback on the position of the shutter 4. This position information is illustrated in FIGS. 3 and 4 by a magneto-sensitive probe 15a reading the magnetic field emitted by an end of axis sensor magnet 16a. This is a version called "end of axis sensor".

Figure 9:
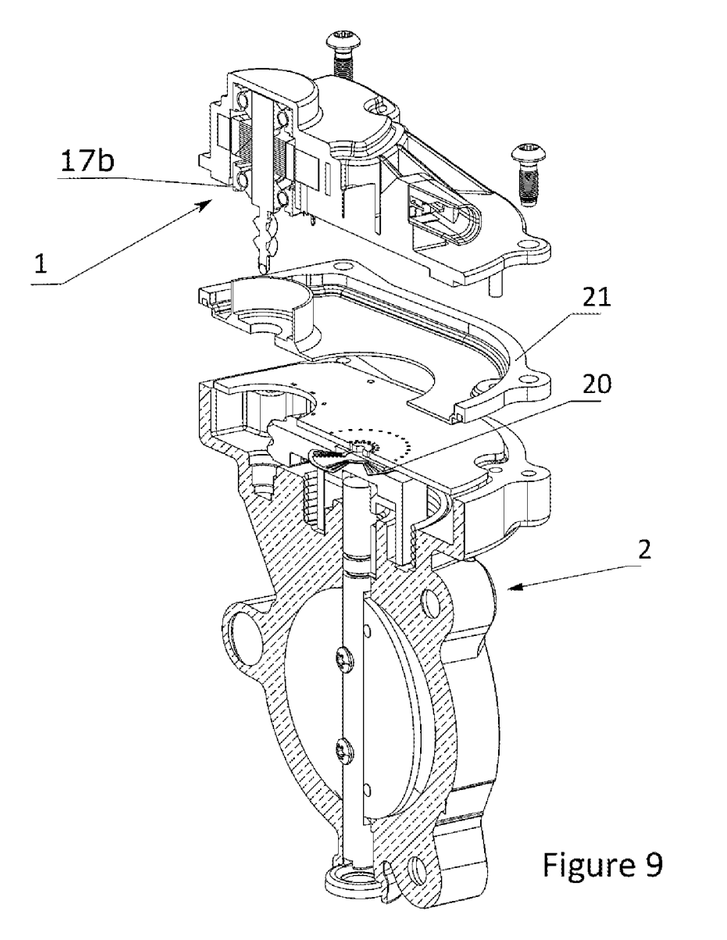

A second magnetic field reading version acting as an encoder is shown in FIGS. 3 and 4 by combining a magnetosensitive probe 15b and a sensor magnet as a sector 16b. This is a version called "off-axis sensor". The combined use of the two types of detection described is not mandatory and only one sensor can be used. This detection principle is not restrictive, other types of sensors can be considered like sensors with magnetic field reading by magnetoresistance or with inductance variation (inductive sensor) or potentiometric type sensors. For example, an inductive type sensor using a coil array 20 is shown in FIGS. 7 and 9.

Figures 5A, 5B:
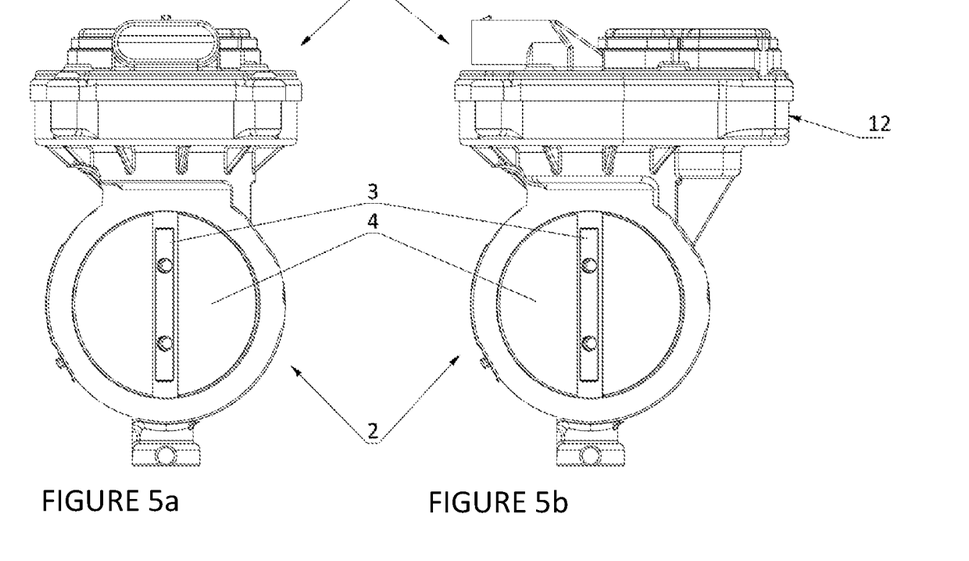
FIGS. 5a and 5b are side views of the two motorized valves of FIG. 1.

FIGS. 5a and 6a show the gear motor 1 in alignment with the duct axis 13, i.e. with the side normal vector 12 parallel to the duct axis 13. 5b and 6b show the gear motor 1 oriented perpendicularly to the illustration of FIGS. 5a and 6a, the normal side vector 12 perpendicular to the duct axis 13. FIGS. 5a, 5b, 6a and 6b illustrate the possibility of angularly orienting the gear motor system around the rotary shaft 3. This mobility allows, depending on the case, to orient the gear motor 1 as well as possible in order to maximize the space available for external elements such as connection cables, air ducts, radiators, etc., with which the actuator must coexist. Since the orientation is adaptable, the angle between the normal side vector 12 and the duct axis 13 can be defined according to the need.

The invention claimed is:

1. A gear motor comprising:
   a set of reduction gears;
   a gear motor body;
   a brushless electric motor formed by a rotor having N pairs of magnetized poles connected to a pinion of the set of reduction gears, the gear motor body having the brushless motor therein;

the pinion driving an output wheel rigidly connected to a rotary shaft;
the brushless electric motor comprising a stator having at least two coils;
the stator having two angular sectors alpha1 and alpha2, of respective radii R1 and R2, with R1 being greater than R2, a center of the radii and the angular sectors being defined relative to a center of rotation of the rotor, the angular sector alpha1 being defined by an angular deviation between axes of first and last of the coils considered in a circumferential direction of the motor, the angular sector alpha1 is less than 180° and comprises the coils, the sector alpha2 being devoid of the at least two coils;
one end of the gear motor body defining a side and the angular sector alpha2 of the stator is positioned adjacent the side and the angular sector alpha1 is positioned opposite the side relative to the center of rotation of the rotor; and
a printed circuit attached to the brushless electric motor, and being positioned between the brushless electric motor and the set of reduction gears.

2. The gear motor according to claim 1, wherein the pinion directly engages the output wheel, and the gear motor has a single reduction stage.

3. The gear motor according to claim 1, wherein the stator has wide teeth and narrow teeth respectively extending radially from an annular gear, the wide teeth having a width greater than or equal to twice the width of the narrow teeth.

4. The gear motor according to claim 1, wherein the pinion has a helical shape.

5. The gear motor according to claim 1, wherein the gear motor comprises a magnetosensitive probe positioned on the printed circuit, and the rotary shaft being rigidly connected to a sensor magnet positioned at an end of the shaft and opposite the magnetosensitive probe.

6. The gear motor according to claim 1, wherein the gear motor comprises a magnetosensitive probe positioned on the printed circuit, and the rotary shaft being rigidly connected to a sensor magnet as an angular sector rotating around the shaft and positioned opposite the magnetosensitive probe.

7. The gear motor according to claim 1, wherein a sensor magnet is positioned radially relative to the shaft, opposite the electric motor.

8. The gear motor according to claim 1, wherein the set of reduction gears has two stages.

9. A motorized air circulation valve comprising:
a gear motor within a gear motor body;
a valve body;
a rotary shaft provided with a shutter, the rotary shaft being moved in rotation by the gear motor;
the gear motor comprising a set of reduction gears;
a brushless electric motor formed by a rotor having N pairs of magnetic poles connected to a pinion of the set of reduction gears;
the pinion driving an output wheel rigidly connected to the rotary shaft;
the brushless electric motor comprising a stator having at least two coils, the stator having two angular sectors alpha1 and alpha2, of respective radii R1 and R2, with R1 greater than R2, a center of the radii and the angular sectors being defined relative to a center of rotation of the rotor, the angular sector alpha1 being defined by an angular deviation between axes of first and last of the coils considered in a circumferential direction of the motor, the angular sector alpha1 is less than 180° and comprises coils, the angular sector alpha2 being devoid of the at least two coils;
one end of the valve body defining a side and the angular sector alpha2 of the stator is positioned adjacent the side and the angular sector alpha1 positioned opposite the side relative to the center of rotation of the rotor; and
a printed circuit attached to the brushless electric motor, and being positioned between the brushless electric motor and the set of reduction gears.

10. The motorized air circulation valve according to claim 9, wherein the gear motor is located above the shutter, the valve body defines a conduit axis and a largest dimension of the gear motor is oriented substantially parallel to the conduit axis.

11. The motorized air circulation valve according to claim 9, wherein the gear motor is located above the shutter, the valve body defines a conduit axis and a largest dimension of the gear motor is oriented substantially perpendicularly to the conduit axis.

12. The motorized air circulation valve according to claim 9, wherein the gear motor is formed by an extension of the valve body on one hand and a cover on another hand.

13. A motorized valve comprising:
a valve body;
a gear motor comprising:
a set of reduction gears;
a brushless electric motor formed by a rotor having N pairs of magnetized poles connected to a first gear of the set of reduction gears;
a printed circuit attached to the brushless electric motor, and being positioned between the brushless electric motor and the set of reduction gears;
the first gear driving an output wheel rigidly connected to a rotary shaft having a shaft axis;
the brushless electric motor comprising a stator having at least two coils; and
the stator having two angular sectors alpha1 and alpha2, of respective radii R1 and R2, with R1 being greater than R2, a center of the radii and the angular sectors being defined relative to a center of rotation of the rotor, the angular sector alpha1 being defined by an angular deviation between axes of first and last of the coils considered in a circumferential direction of the motor, the angular sector alpha1 is less than 180° and comprises the coils, at least a portion of the angular sector alpha1 directly adjacent to the first gear in a direction of the shaft axis, the sector alpha2 being devoid of the at least two coils.

* * * * *